United States Patent Office 3,284,524
Patented Nov. 8, 1966

3,284,524
METHOD AND CATALYST FOR PREPARING ALKYLBENZENES
Benedetto Calcagno, Milan, Italy, assignor to Societá Italiana Resine S.p.A., Milan, Italy
No Drawing. Filed Dec. 13, 1963, Ser. No. 330,259
Claims priority, application Italy, Jan. 18, 1963, 1,105/63
9 Claims. (Cl. 260—671)

This invention relates to alkylbenzenes, that is, alkylaromatic compound wherein an atom of hydrogen in a benzene ring is substituted by an aliphatic chain.

Alkylbenzenes have a wide range of technical uses. For instance ethylbenzene is useful for preparing styrene, isopropylbenzene is employed for the phenol and acetone synthesis, alkylbenzenes with a number of carbon atoms in the side chain ranging between 8 and 16 (more particularly dodecylbenzene) are intermediates in the manufacture of sulphonated detergent, while alkylbenzenes with a higher number of C-atoms are useful in the field of lubricants.

This invention concerns more particularly alkylbenzenes having 8 to 16 carbon atoms in the aliphatic chain, suitable for preparing sulphonated detergents. Such alkylbenzenes are normally obtained by first preparing the desired aliphatic compound by oligomerization of an olefin, and thereafter alkylating benzene by means of the resulting aliphatic compound. The aliphatic compound in question can be of a linear or branched chain type. Generally, with manufacturing processes known to date, the chain is branched.

It has recently been disclosed that detergents derived from alkylbenezenes with a branched aliphatic chain are not decayed, departing from such with a linear chain, by aerobic bacteria and therefore tend to accumulate in water discharged from plants employing such detergents.

A general purpose of this invention is to provide a one-stage method of preparing alkylbenzenes containing 8 to 16 carbon atoms in the aliphatic chain, that is, a method wherein an olefin (such as ethylene, propylene or butene) is put in a condition to react with benzene to directly yield the desired alkylbenzenes.

A special purpose of this invention is to provide a method as mentioned above, capable of yielding alkylbenzene with a linear chain, more particularly suitable for preparing sulphonated detergents.

A further object of this invention is to provide a catalyst for carrying out the method.

According to a broader feautre of this invention, an olefin such as ethyene, propylene or butene is reached with benzene in the presence of a catalyst comprising (a) an aluminum halide, preferably chloride or bromide, of the formula $AlX_3$ wherein X is a halogen, (b) an aluminum compound of the formula $AlR_n X_{(3-n)}$ wherein R is an atom of hydrogen or a non-substituted alkyl, cycloaliphatic or aromatic hydrocarbon radical, and $n$ ranges between 1 and 3 inclusive, (c) being a titanium, vanadium, zirconium, chromium or iron halide. When R is an alkyl radical, it advantageously has a maximum number of 10 carbon atoms.

The reaction is advantageously effected in an inert anhydrous environment.

When the reacting olefin is ethylene, the resulting products prevailingly comprise phenylalkanes with a linear chain and an even number of carbon atoms in the chain, such as phenylethane, phenylbutane, phenylhexane, phenyloctane, phenyldecane, phenyldodecane. The relative quantities of the various compounds forming the raw reaction products range within relatively wide limits. Since data deriving from the conversion value, centesimal analysis and infrared analysis were found to be insufficient to provide satisfactory information so as to the exact composition of the raw reaction product, an additional method of analysis was found necessary, comprising a special fractionation of the raw product into five fractions, as follows:

(1) Fraction distilling at 760 torr between 120° and 140° C.; mainly comprising ethylebenzene;
(2) Fraction distilling at 60 torr up to a temperature of 150° C., mainly comprising butyl- and hexylbenzene;
(3) Fraction distilling at 1 torr up to 210° C., comprising alkylebenzenes with a side chain having 8 to 16 carbon atoms;
(4) Distillation tail fractions comprising alkylbenzenes with chains containing up to 30° C. atoms;
(5) Solid polymers separable by filtering the raw reaction product.

For the purposes of this invention a maximum quantity of products of fraction 3 and very little or none of the remaining fractions are desirable. More particularly, the formation of solid polymers and distillation tail fractions should be avoided.

Under the latter aspect it was found that a considerable difference in the composition of the raw reaction product exists depending upon whether the catalyst is obtained by simply intermixing the three components (a)–(c) recited above or through a special forming reaction. For instance, by mixing together triethylaluminum $Al(C_2H_5)_3$, aluminum trichloride ($AlCl_3$) and titanium tetrachloride ($TiCl_4$) an appreciable percentage of distillation tail fractions (fraction 4) and solid polymers (fraction 5) is obtained, especially if a low proportion of aluminum trichloride with respect to the aluminum- organic compound is employed.

Conversely, fractions 4 and 5 are practically avoided by preparing the two aluminum compounds by reacting one mole of a non-substituted alkyl (or cycloalkyl or aryl) aluminum with more than two moles of an aluminum halide.

In this connection and referring for the sake of simplicity to ethylaluminum ($AlEt_3$, wherein Et denotes ethyl) and aluminum trichloride, the possible reactions of the two compounds are as follows:

(I)                 $2AlEt_3 + AlCl_3 \rightarrow 3AlEt_2Cl$
(II)                $AlEt_3 + AlCl_3 \rightarrow Al_2Et_3Cl_3$
(III)              $AlEt_3 + 2AlCl_3 \rightarrow 3AlEtCl_2$
(IV)     $AlEt_3 + nAlCl_3 \rightarrow 3AlEtCl_2 + (n-2)AlCl_3$ wherein $n$ is greater than 2.

It will be easily seen that the products of the first three reactions, when associated with a compound of a transition metal, lead to the known Ziegler catalysts for polymerizing olefins. The characteristic reaction of this invention is rather the one listed sub IV, which is brought about by reacting one mole ethylaluminum with more than two moles of aluminum chloride. The product of this reaction distinguishes in that the ratio of the alkyl groups to the number of halogen atoms is lower than 0.5. The ratio preferably ranges between 0.3 and 0.1.

A further important factor to obtain prevailingly fraction 3 described above is the ratio of the number of alkyl (or cycloalkyl or aryl) groups to the number of moles of titanium (or vanadium, zirconium, chromium or iron) halide in the catalyst. It was found that this ratio should be lower than 3 and preferably range between 0.1 and 1; in other words, 1 to 10 moles of said halide are generally required to each alkyl group in the catalyst.

In order to form a useful catalyst for the purposes of this invention, a finely subdivided aluminum halide, such as $AlCl_3$ is dispersed in benzene, a dispersion (solution) in benzene of alkyl (or cycloalkyl or aryl) aluminum such as $AlEt_3$ is separately formed, and both dispersions are thoroughly intermixed; the benzene dispersion (solution or suspension) of titanium (or vanadium, zirconium, chromium or iron) halide is added to the sum of the first two dispersions either in a pre-mixer or in the reactor itself in which benzene is reacted with ethylene.

Of course, when the catalyst is obtained instead of through a chemical reaction by directly mixing the three components (a), (b), (c) recited above, the mixing order is irrelevant.

The benzene alkylation process can be carried out in discontinuous or continuous manner. In any case, it comprises the steps of forming a benzene dispersion of the catalyst in a reactor equipped with a stirring mechanism or equivalent means, and setting up in the reactor a suitable ethylene pressure. All the ingredients of the reaction mixture should be substantially anhydrous and free from reactive impurities, such as oxygen or air. If necessary or desired the reaction can be carried out in an inert gas, such as nitrogen.

The reaction temperature of benzene and ethylene ranges between 0° and about 80° C., preferably between 40° and 60° C. On rise in temperature the alkylation rate increases, volatile fractions 1 and 2 increasing too. The proportion of volatile fractions, more particularly ethylbenzene also increases with rise in ethylene pressure. It is therefore advantageous to carry out the reaction at a gauge pressure of ethylene which is relatively low and ranges between a fraction of atmosphere and about ten atmospheres, the preferred range being between 1 and 5 atm. gauge.

The catalyst concentration in the reactor appreciably affects both the rate of alkylation and formation of fractions having a relatively high boiling point; the most advantageous concentration corresponds to 1 to 5 gr. aluminum halide to one liter benzene in the reactor.

As reaction proceeds the possibility of dialkylation reactions increases. To avoid as far as possible such side reactions, the time of the main reaction in a discontinuous process, or the residence time of the reagents in a continuous process should be limited so that the concentration of alkylated reaction products does not exceed about 20% by weight; preferably, such concentration should range between 10% and 15%. Upon reaching this concentration the reaction is discontinued by decomposition of the catalyst. This can be obtained in a very simple manner by adding water to the reaction mixture, so that the components of the catalyst are in part decomposed and dissolved in water, respectively. The organic phase is then separated from the watery phase and distilled for recovery of unreacted benzene; the distillation residue is the raw reaction product referred to above.

The ethylene employed for reaction with benzene can be admixed with other gases, provided the latter are anhydrous and inert under reaction conditions. More particularly, it is possible to employ the $C_2$ fraction of the cracking gas, comprising ethylene and ethane; if course, in the latter case the total pressure in the reactor should be raised in order to maintain the ethylene pressure within the previously indicated limits.

As mentioned above, the ingredient (a) of the catalyst is preferably aluminum chloride or bromide. The radical R appearing in ingredient (b) is preferably selected from the group consisting of ethyl, methyl, isobutyl, cyclohexyl, phenyl and benzyl radicals. The ingredient (c) is preferably selected from the group consisting of $TiCl_4$, $VCl_4$, $ZrCl_4$, $CrCl_3$, $FeCl_3$, $TiBr_4$, $VBr_4$, $ZrBr_4$, $CrBr_3$ and $FeBr_3$.

The typical composition of the raw reaction product obtained by this method is as follows:

| | Volume percent |
|---|---|
| Ethylbenzene | 10–20 |
| Butyl- and hexylbenzene | 10–15 |
| Alkylbenzenes $C_8$–$C_{16}$ | 50–65 |
| Tail fractions | 0–10 |

Among the following examples, Examples 1 to 3 show the effect of temperature, Examples 4 to 6 show the effect of the catalyst concentration, Examples 6 and 7 show the effect of the catalyst ingredient ratios, and Examples 2 to 8 show the effect of ethylene pressure.

EXAMPLE 1

A Pyrex glass reactor of 5 liter volume equipped with a stirrer, a gas inlet tube and a thermometer is charged in a dry nitrogen environment with 10 gr. aluminum chloride and 1.4 ml. 92% triethylaluminum (a title potentiometrically determined by means of isoquinoline) in 3.5 liters anhydrous benzene. After about 5 minutes stirring 1.9 gr. titanium tetrachloride dissolved in 500 ml. anhydrous benzene are added. Nitrogen is removed from the reactor by suction, whereupon ethylene is supplied at atmospheric pressure, the reactor being cooled by means of an external water bath in order to maintain the temperature constantly at 30° C.

After two hours, supply of ethylene is discontinued and the contents of the reactor are poured while stirring in an equivalent water volume to fully decompose the catalyst ingredients.

The organic layer is decanted off and subsequently distilled to remove excess benzene. Upon separation of benzene 324 gr. alkylation raw products are obtained. On subsequent fractional distillation the raw product is found to comprise:

| | Percent |
|---|---|
| Eethylbenzene | 5 |
| Butyl- and hexylbenzene | 38 |
| Fraction from octyl to hexadecylbenzene | 28 |
| Tail fractions | 29 |

EXAMPLE 2

A test was carried out at a temperature of 50° C. in the same equipment, under the same conditions and by using the same quantities of the various reagents described in the preceding example. On completion of the test the catalyst is destroyed by admixing the reaction product with water, the organic layer is separated, excess benzene is removed and the raw alkylation product is fractionated similarly as described in Example 1.

398 gr. raw product are obtained, of the following composition:

| | Percent |
|---|---|
| Ethylbenzene | 13.9 |
| Butyl- and hexylbenzenes | 18.1 |
| Fraction from octyl to hexadecylbenzene | 61 |
| Tail fractions | 7 |

EXAMPLE 3

A test was carried out at a temperature of 60° C. in the same equipment, under similar conditions and by employing the same quantities of the various reagents indicated in the preceding example. On completion of the test the catalyst is destroyed by admixing the recation product with water; the organic layer is separated, excess benzene is removed and the raw alkylation product is fractionated similarly as described in Example 1.

423 gr. raw product are obtained of the following composition:

| | Percent |
|---|---|
| Ethylbenzene | 26 |
| Butyl- and hexylbenzenes | 19 |
| Fraction from octyl to hexadecylbenzenes | 46 |
| Tail fractions | 9 |

EXAMPLES 4–5–6

Three alkylation tests were carried out at a temperature of 50° C. under similar conditions as described in the preceding examples, by varying the quantity of the three ingredients of the catalytic system, their relative proportions being, however, left unaltered.

The data relating to the tests are summarized in Table 1.

TABLE NO. 1

| Example No. | AlCl₃, gr. | AlEt₃, ml. | TiCl₄, gr. | Raw, gr. | Percent C₂[1] | Percent C₄–C₁₆[1] | Percent C₈–C₁₆[1] | Percent tail fractions |
|---|---|---|---|---|---|---|---|---|
| 4 | 20 | 2.8 | 3.8 | 358 |  | 4 | 55 | 41 |
| 5 | 10 | 1.4 | 1.9 | 386 | 14 | 16 | 60 | 10 |
| 6 | 5 | 0.7 | 0.95 | 331 | 38 | 11 | 47 | 4 |

[1] Number of carbon atoms in the side chain.

EXAMPLE 7

An alkylation test was carried out at a temperature of 50° C. in the same equipment, under similar conditions and by employing the same quantities of benzene, the catalyst comprising 5 gr. aluminum chloride, 1.4 ml. triethylaluminum and 0.95 gr. titanium tetrachloride.

285 gr. raw alkylation product are obtained, which show on fractional distillation the following composition:

| | Percent |
|---|---|
| Ethylbenzene | about 0 |
| Butyl- and hexylbenzenes | 12 |
| Fraction from octyl- to hexadecylbenzenes | 23 |
| Tail fractions | 65 |

EXAMPLE 8

10 gr. aluminum chloride and 1.4 ml. triethylaluminum in 3.5 liters anhydrous benzene, subsequently 1.9 gr. titanium tetrachloride dissolved in 500 ml. anhydrous benzene are charged to a 5 liter autoclave of stainless steel equipped with an anchor stirrer, cooling water circulation jacket and dipping tube for admission of ethylene in a dry nitrogen environment. Ethylene is supplied at a pressure of 3 atm. during a period of two hours, the temperature of the reacting mass being maintained at 50° C. On completion of the test the same procedure is followed as in Example 1, and 495 gr. raw alkylate of the following composition are recovered.

| | Percent |
|---|---|
| Ethylbenzene | 32 |
| Butyl- and hexylbenzenes | 14 |
| Fraction from octyl- to hexadecylbenzenes | 44 |
| Tail fractions | 10 |

EXAMPLE 9

7.3 gr. aluminum chloride and 3.1 ml. dichloromonoethylaluminum in 3.5 liters anhydrous benzene, subsequently 1.9 gr. titanium tetrachloride dissolved in 500 ml. anhydrous benzene are charged to a 5 liter Pyrex glass reactor of the type described in Example 1 in a dry nitrogen environment. Next the procedure described in Example 1 is followed, the temperature being maintained at 50° C. On completion of test 335 gr. raw alkylate of the following composition are recovered:

| | Percent |
|---|---|
| Ethylbenzene | 26 |
| Butyl- and hexylbenzenes | 11 |
| Fraction from octyl- to hexadecylbenzenes | 52 |
| Tail fractions | 11 |

EXAMPLE 10

An alkylation test was carried under the same conditions as described in Example 2 and by the same procedure, substituting for triethylaluminum an equivalent quantity of triisobutylaluminum.

Similar results were obtained as in Example 2.

What I claim is:

1. The method for preparing alkylbenzenes having a linear alkyl chain comprising,
   reacting benzene with a hydrocarbon selected from the group consisting of ethylene, propylene and butene in the presence of a catalyst comprising
   (a) the reaction product of one mole alkylaluminum with more than two moles of an aluminum halide, and
   (b) a halide of a metal selected from the group consisting of titanium, vanadium, zirconium, chromium and iron.

2. The method as claimed in claim 1, wherein from 1 to 10 moles of the component (b) of said catalyst are present per hydrocarbon radical in the catalyst.

3. The method as claimed in claim 1, wherein the ratio of the number of hydrocarbon radicals to the number of halogen atoms in the said reaction product is from 0.3 to 0.1.

4. The method as claimed in claim 1, wherein the reaction is carried out in an inert anhydrous environment.

5. The method as claimed in claim 1, wherein the reaction is stopped when the concentration of the alkylated products in benzene is between 10% and 20% by weight.

6. The method as claimed in claim 1, wherein the concentration of the catalyst in benzene corresponds to a content of from 1 to 5 gr. of aluminum halide per 1 liter of benzene.

7. The method as claimed in claim 1, wherein the pressure of said hydrocarbon is lower than 5 atm. gauge.

8. The method as claimed in claim 1, wherein the reaction temperature is between 0° and 80° C.

9. The method as claimed in claim 1, wherein the reaction temperature is between 40° and 60° C.

References Cited by the Examiner

UNITED STATES PATENTS

| | | | |
|---|---|---|---|
| 2,824,145 | 2/1958 | McCall et al. | 260—671 |
| 3,104,267 | 9/1963 | Antonsen et al. | 260—671 |
| 3,131,171 | 4/1964 | Calfee | 260—683.15 |

DELBERT E. GANTZ, *Primary Examiner.*

C. R. DAVIS, *Assistant Examiner.*